(12) United States Patent
Boston et al.

(10) Patent No.: US 11,640,554 B2
(45) Date of Patent: May 2, 2023

(54) BLOCKCHAIN-BASED TRAINING DATA MANAGEMENT SYSTEM AND METHOD FOR TRUSTED MODEL IMPROVEMENTS

(71) Applicant: KPMG LLP, New York, NY (US)

(72) Inventors: Marisa Ferrara Boston, Denver, CO (US); Christopher H. L. Wicher, Raleigh, NC (US); Rupa Shah, Morristown, NJ (US)

(73) Assignee: KPMG LLP, New York, NY (US)

( * ) Notice: Subject to any disclaimer, the term of this patent is extended or adjusted under 35 U.S.C. 154(b) by 697 days.

(21) Appl. No.: 16/697,608

(22) Filed: Nov. 27, 2019

(65) Prior Publication Data

US 2021/0027196 A1 Jan. 28, 2021

Related U.S. Application Data

(63) Continuation of application No. 16/521,302, filed on Jul. 24, 2019, now Pat. No. 10,528,890.

(51) Int. Cl.
  *G06N 20/00* (2019.01)
  *G06F 16/182* (2019.01)
  *G06F 16/11* (2019.01)
  *H04L 9/06* (2006.01)

(52) U.S. Cl.
  CPC .......... *G06N 20/00* (2019.01); *G06F 16/125* (2019.01); *G06F 16/1837* (2019.01); *H04L 9/0637* (2013.01); *H04L 9/0643* (2013.01)

(58) Field of Classification Search
  None
  See application file for complete search history.

(56) References Cited

U.S. PATENT DOCUMENTS

| | | | |
|---|---|---|---|
| 2004/0128240 A1* | 7/2004 | Yusin | G07F 7/08 705/42 |
| 2015/0229648 A1* | 8/2015 | Avery | G06F 21/62 726/30 |
| 2018/0218455 A1 | 8/2018 | Kolb et al. | |
| 2018/0227119 A1 | 8/2018 | Bibera et al. | |
| 2018/0285839 A1 | 10/2018 | Yang et al. | |
| 2019/0005029 A1* | 1/2019 | Mills | G06F 40/30 |
| 2019/0188399 A1 | 6/2019 | Palaniappan et al. | |
| 2019/0354935 A1* | 11/2019 | Hanratty | G06Q 10/1053 |

OTHER PUBLICATIONS

Bai X, Cheng Z, Duan Z, Hu K. Formal modeling and verification of smart contracts. In Proceedings of the 2018 7th international conference on software and computer applications Feb. 8, 2018 (pp. 322-326). (Year: 2018).*

(Continued)

*Primary Examiner* — Vincent Gonzales
(74) *Attorney, Agent, or Firm* — Hunton Andrews Kurth LLP

(57) ABSTRACT

Systems and methods disclosed herein are directed to blockchain-based training data management systems and methods for trusted improvements of models. Embodiments provide for the generation of metadata and smart contracts associated with certain data, using a blockchain to store the generated metadata and smart contracts, and curating training data for the improvement of the models utilizing the generated metadata and smart contract stored in the blockchain.

18 Claims, 8 Drawing Sheets

(56) References Cited

OTHER PUBLICATIONS

Demichev et al., "The Approach to Managing Provenance Metadata and Data Access Rights in Distributed Storage Using the Hyperledger Blockchain Platform", arXiv:1811.12706v1 [cs.DC] (Nov. 2018) 6 pages.
Mery et al., "Make your blockchain smart contracts smarter with business rules"—IBM DeveloperWorks, www.ibm.com/developerWorks (Aug. 2017) 21 pages.
Ramachandran et al., "SmartProvenance: A Distributed, Blockchain Based Data Provenance System", CODASPY (Mar. 2018) 8 pages.
Datum Network, "The decentralized data marketplace", White Paper V15, 2017, 37 pgs.
LexisNexis Risk Solutions, "The blockchain story is still being written", White paper, Aug. 2018, 11 pgs.
Amershi et al., Power to the People: The Role of Humans in Interactive Machine Learning, AI Magazine 2014, pp. 105-120.
Sculley et al., "Hidden Technical Debt in Machine Learning Systems", 2015, 9 pgs.
Simard et al., "Machine Teaching: A New Paradigm for Building Machine Learning Systems", 2017, 14 pgs.
Reinhardt et al., "Knowledge Worker Roles and Actions-Results of Two Empirical Studies", Knowledge Process Mgmt, 2011, 25 pgs.
Everts, et al., "Will that smart contract really do what you expect it to do", White paper, Groningen: TRO, Jan. 2018, 28 pgs.
Buterin, Vitalik, "A next-generation smart contract and decentralized application platform." White paper, Mar. 2014, 36 pgs.
International Search Report and Written Opinion dated Aug. 31, 2020 in corresponding International Application No. PCT/US2020/042849 (7 pages).
International Bureau, International Preliminary Report on Patentability, International Application No. PCT/US2020/042849, dated Feb. 3, 2022, pp. 1-6.

\* cited by examiner

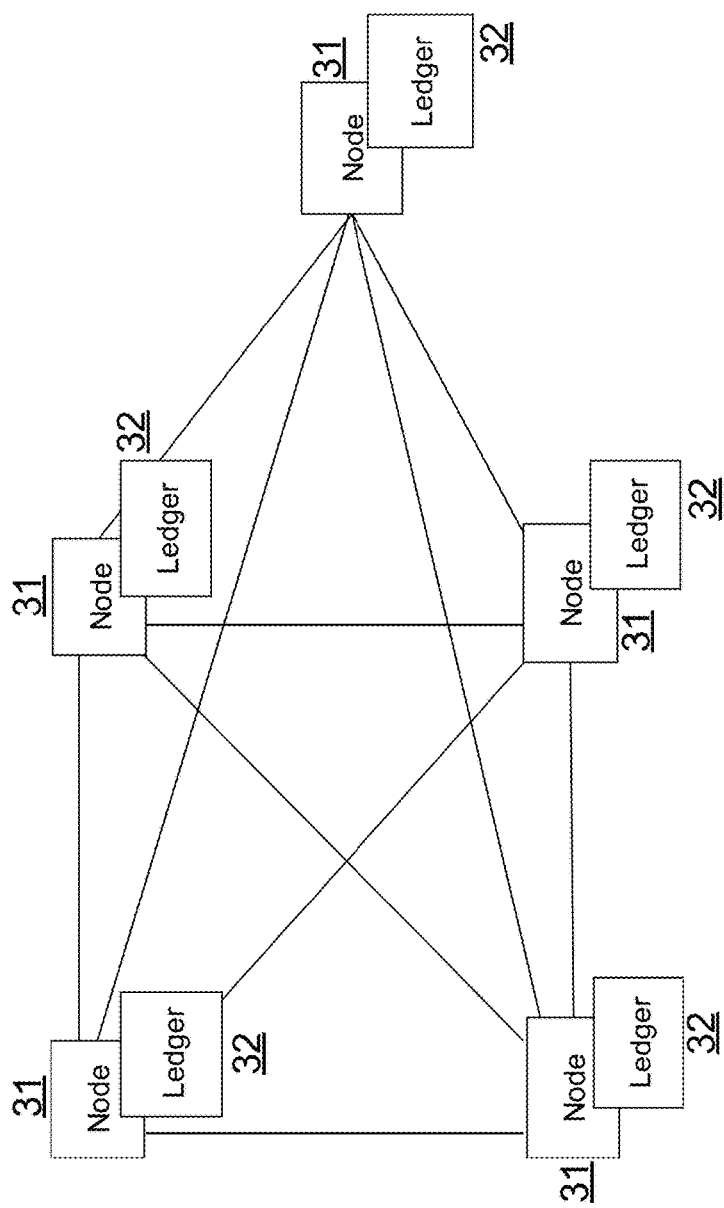

FIG. 3

```
name="560_Lexington_Appraisal.pdf"
original_name="Appr_92379904737B4.pdf"
provenance="audit_Engagement_34568"
owner="X_Bank"
user_prerequisites=true
location="https://kpmgaudit.azuredatalakestore.net/webhdfs/v1/auditFiles/"
smp_curator_approved=false
ds_curator_approved=false
retention=false
purge=false accessKey=01dfae6e5d4d90d989262232595,9afbe:7050461
open=f0fda586303,10a6dd91a7d8f0a4ceda2:42256374,26
read=b31d032cfdcf47a399990a71e43c5d2a:144816
```

Metadata 11

FIG. 4A

Smart_Contract_12

```
/*Curation transactions*/
//SMP curation
function smp_curate(file _metadata)
        returns (bool success) {
           _metadata.smp_curator_approved = true

}

//Data science curation
function ds_curate(file _metadata)
        returns (bool success) {
                if (!(_metadata.smp_curator_approved)) throw;

_metadata.ds = true

}

/*User transactions*/

//request access
function request(file _metadata user _from)
        returns (bool success) {
        approvedList = curl -i -X LIST -L  -H "Authorization: Bearer <REDACTED>" 'https://auditVault.vault.azure.net/keys/auditLakeKeys/1.0' if (_from in approvedList){
                msg[_from][_metadata.accessKey]
        }
        else{
                throw;
        }
}

//get access
function access(file _metadata _from)
        returns (bool success) {
        approvedList = curl -i -X LIST -L  -H "Authorization: Bearer <REDACTED>" 'https://auditVault.vault.azure.net/keys/auditLakeKeys/1.0' if (_from in approvedList){
                msg[_from][_metadata.open]
                msg[_from][_metadata.read]
        }
        else{
                throw;
        }
}

//revoke access
function revoke(file _metadata user _from)
        returns (bool success) {
        curl -i -X DELETE-L  -H "Authorization: Bearer <REDACTED>" 'https://auditVault.vault.azure.net/keys/auditLakeKeys/1.0'
}
```

<u>Smart Contract 12</u>

FIG. 4B

Smart_Contract_12

/*MDM transactions*/

```
//Add to audit lake
function add(file _metadata from _fromLoc to _toLoc key _key)
        returns (bool success) { if (_metadata.purge) throw;

fileNameLoc = _fromLoc + _metadata.name curl -i -X PUT -L -T '_fileNameLoc' -H "Authorization: Bearer <REDACTED>" 'https://kpmgaudit.azuredatalakestore.net/webhdfs/v1/auditFiles/?op=CREATE'

_metadata.location = "https://kpmgaudit.azuredatalakestore.net/webhdfs/v1/auditFiles/"+_metadata.name

}

//Purge from audit lake
function purge(file _metadata)
        returns (bool success) { if (_metadata.retain) throw;

fileNameLoc = _metadata.location + _metadata.name
        curl -i -X DELETE -H "Authorization: Bearer <REDACTED>" fileNameLoc'?op=DELETE'

_metadata.purge = true;

}

//Retain
function retain(file _metadata)
        returns (bool success) {

_metadata.retain = true

} function () {
        throw;
}
```

<u>Smart Contract 12</u>

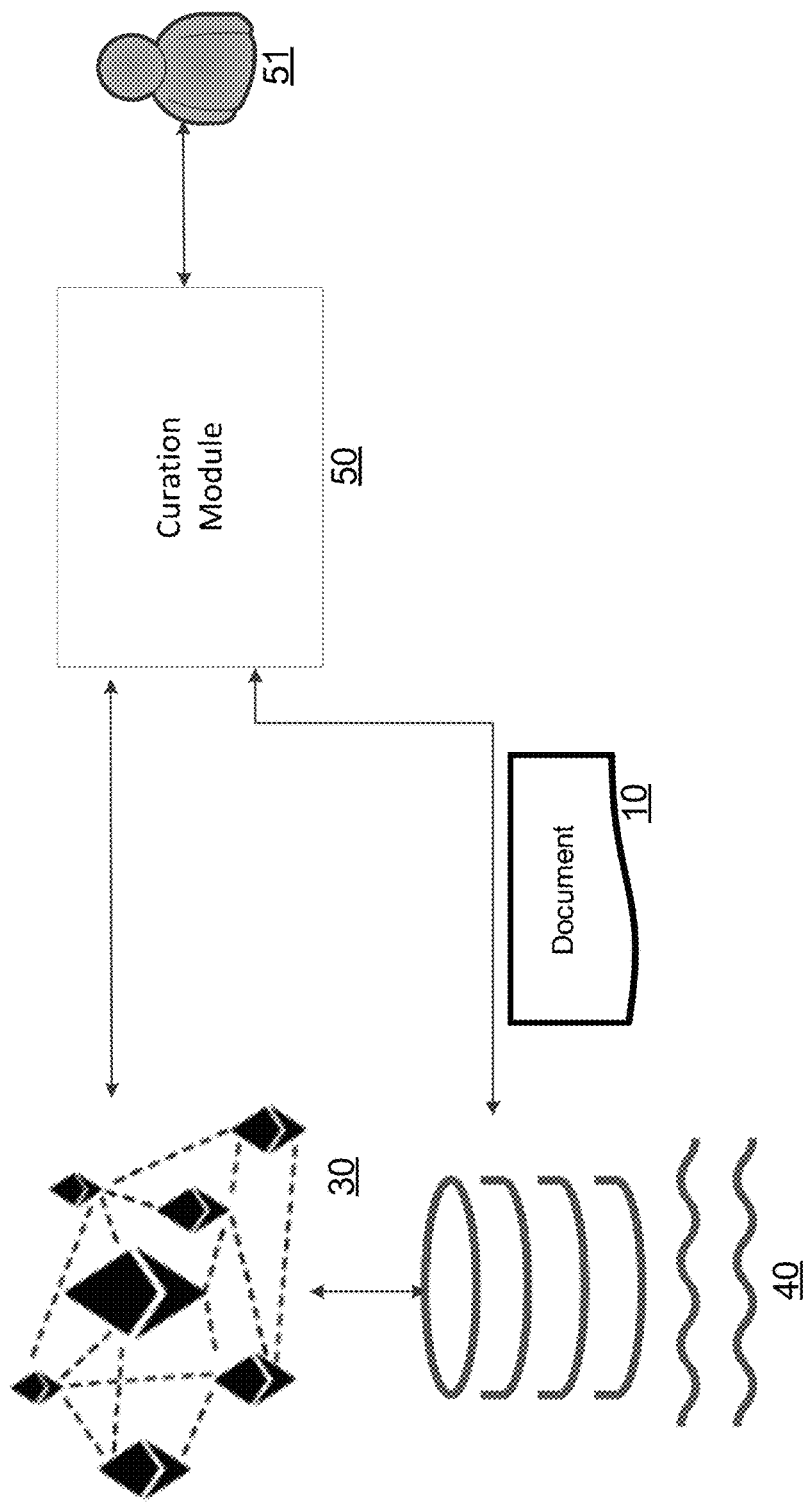

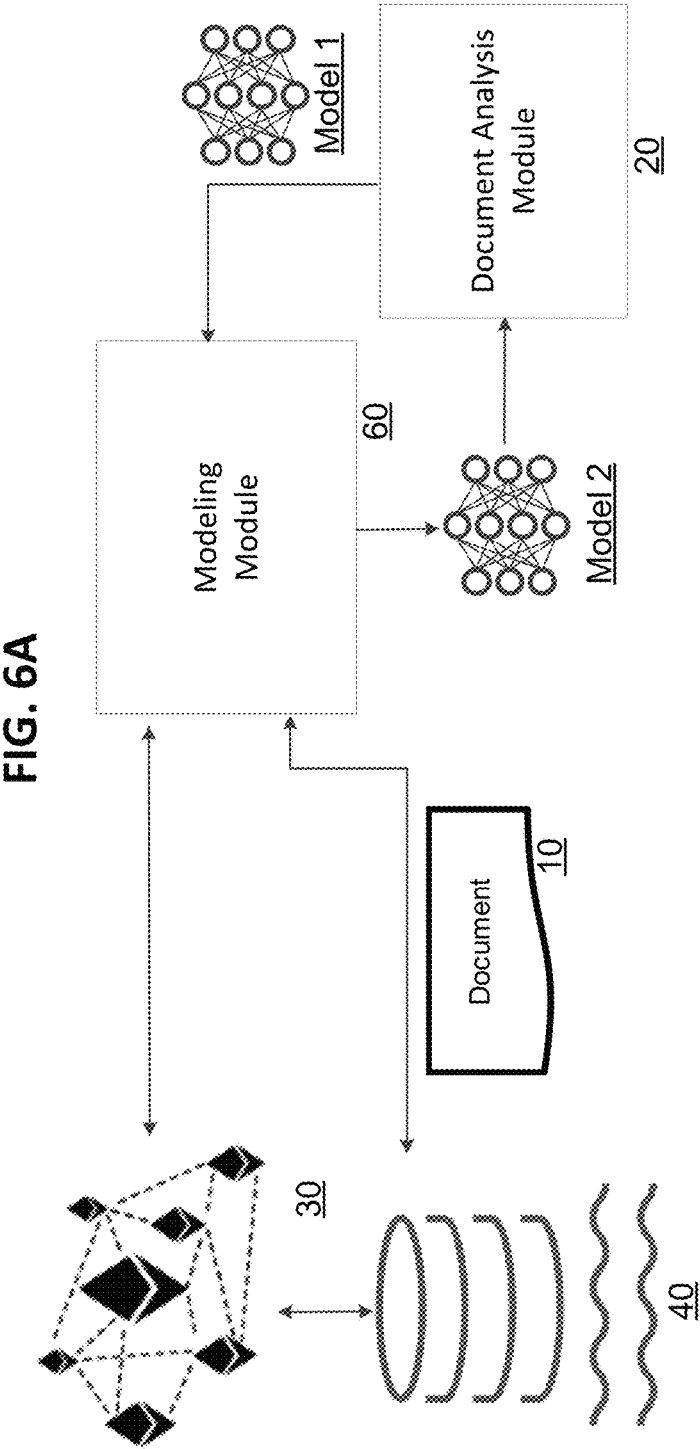

BLOCKCHAIN-BASED TRAINING DATA MANAGEMENT SYSTEM AND METHOD FOR TRUSTED MODEL IMPROVEMENTS

CROSS-REFERENCE TO RELATED APPLICATION(S)

This application is a continuation of, claims the benefit of the filing date of, and incorporates by reference thereto in its entirety, U.S. patent application Ser. No. 16/521,302, filed Jul. 24, 2019.

FIELD OF THE INVENTION

The present invention relates to blockchain-based training data management systems and methods for trusted improvements of models, as well as more accurate data curation.

BACKGROUND

Many cognitive systems are driven by machine learning models. Such machine learning models can include a variety of algorithms (e.g., supervised learning, unsupervised learning, reinforcement learning, knowledge-based learning, natural-language-based learning such as natural language generation and natural language processing, deep learning, etc.) and can access execution engines comprising software packages that enable implementation of the algorithm. These machine learning models are trained using data. This training data is used to modify and fine-tune the weights associated with the machine learning models, as well as record ground truth for where correct answers can be found within the data. As such, the better the training data is, the more accurate and effective the machine learning model will be.

However, there are many challenges associated with the management of training data. For example, the quality of the data may be inconsistent, the data may be stale (i.e., old), the data may no longer be relevant, or the data may no longer be accessible because of ownership restrictions. These same challenges can apply to the machine learning model itself, e.g., ownership, versioning, and/or freshness.

Further, current data management protocols continue to be tightly controlled by human moderators, particularly in risk-averse and tightly-regulated industries like audit. These human-based data management policies are appropriate given older, less data-intensive processes, but do not scale well as organizations undergo digital transformation. In particular, as the processes become more data-intensive, processing overload becomes a greater risk, leading to a higher chance of failure due to human error, resulting in diminished accuracy. Further, if certain training data is removed because of the ownership, versioning, and/or freshness challenges stated above, the current human-based data management systems are unequipped to either (i) determine when such data is actually removed or (ii) update the machine learning model based on the removal.

It would be desirable, therefore, to have systems and methods that could overcome these and other deficiencies of known systems.

SUMMARY

According to an embodiment, the invention relates to a blockchain-based training data management system and method for trusted improvements of models, such as machine learning (ML) models.

According to an embodiment, the invention relates to a computer-implemented system for managing the curation of training data that is used to train a computer model, wherein the training data comprises a plurality of electronic documents. The system may include: (i) a blockchain comprising a plurality of nodes operating on computer servers, wherein the nodes are connected via a network; (ii) an electronic database for storing the plurality of electronic documents; and (iii) at least one computer processor, wherein the at least one computer processor is programmed with software to: (a) with a document analysis module, receive at least one electronic document, generate a corresponding smart contract and metadata, and transmit the smart contract and the metadata to the blockchain for storage in a block on the blockchain, wherein the metadata specifies a curation status for the at least one electronic document, and the smart contract controls document access to the at least one electronic document; (b) with a curation module, using the smart contract and the metadata, determine a set of electronic documents that qualify to be reviewed by a curator, retrieve the at least one electronic document from the electronic database and present the at least one electronic document to the curator, receive from the curator an indication of whether the at least one electronic document constitutes training data, and save the indication as metadata in the block on the blockchain; and (c) with a modeling module, retrieve a plurality of electronic documents from the electronic database that have been designated as training data, and train the computer model using the designated documents as training data.

According to another embodiment, the invention relates to a computer-implemented system for managing the curation of training data that is used to train a computer model, wherein the training data comprises a plurality of electronic documents. The system may include: (i) a blockchain comprising a plurality of nodes operating on computer servers, wherein the nodes are connected via a network; and (ii) at least one computer processor, wherein the at least one computer processor is programmed with software to: (a) generate a smart contract and metadata associated with at least one electronic document; (b) transmit the smart contract and the metadata to the blockchain for storage in a block on the blockchain; and (c) train the computer model using the at least one document as training data based on the smart contract and metadata in the blockchain.

According to an embodiment, the invention relates to a computer-implemented method for managing the curation of training data that is used to train a computer model, wherein the training data comprises a plurality of electronic documents. The method may include: receiving, with a document analysis module comprising software running on at least one computer processor, at least one electronic document; generating, with the document analysis module, a corresponding smart contract and metadata corresponding to the electronic document, wherein the metadata specifies a curation status for the at least one electronic document, and the smart contract controls document access to the at least one electronic document; transmitting, with the document analysis module, the smart contract and the metadata to a blockchain for storage in a block on the blockchain, wherein the blockchain comprises a plurality of nodes operating on computer servers, wherein the nodes are connected via a network; storing, with an electronic database, the at least one electronic document; determining, with a curation module comprising software running on the at least one computer processor, a set of electronic documents that qualify to be reviewed by a curator based on the smart contract and the metadata; retrieving, with the curation module, the at least one electronic document from the database and presenting the at least one electronic document to the curator; receiving, with the curation module, a designation from the curator of whether the at least one electronic document qualifies as training data; storing, with the curation module, the designation as metadata in a block on the blockchain; retrieving, with a modeling module comprising software running on the at least one computer processor, a plurality of electronic documents from the database that have been designated as training data; and training, with the modeling module, the computer model using the documents designated as training data.

Exemplary embodiments of the invention can provide a number of advantages. For example, the blockchain can provide a clear demarcation of access and privileges for the training data (e.g., documents) as well as a complete audit trail. In addition, a more accurate list of who or what accesses the data can be maintained (as opposed to simply tracking what data is added to and removed from a database). In particular, with the use of the generated metadata, the blockchain is able to track, in real-time, how multiple parties interact with the data. Further, the blockchain allows for a more focused intervention of human curators during the curation process (e.g., curators focus on substantive analysis of the training data rather than the logistics of tracking the history and access to the data). In addition, the use of smart contracts can also lead to fully-automated systems wherein thresholds for approval can be set so that certain data can automatically be tagged as qualified to be used as training data. As such, training data can bypass curation for continuous improvement of the system. Further, the metadata can be used in tandem with smart contracts to provide data exchange capabilities for larger amounts of information (e.g., only the metadata and smart contracts are stored on the blockchain rather than the entire document, because blockchain technology is not able to handle/store large amounts of data).

In addition, embodiments of the present invention can provide for internal training data permission management for machine-machine or human-machine interaction during the curation process. These permissions, which include read-write-access to the database, can also preserve and retain documents, or remove documents from consideration if, for example, ownership is changed. Further, embodiments of the invention also allow for the minimization of bias in training data, e.g., by implementing bias mitigation algorithms on the curated training data before it used to re-train the machine learning model. Other types of algorithms, e.g., preservation and/or retention scripts, can also be implemented according to exemplary embodiments of the invention.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

FIG. 2B depicts an example embodiment of a distributed ledger in the blockchain of FIG. 2A.

FIG. 2C depicts an example embodiment of a blockchain ledger associated with the functional interaction in FIG. 2A.

FIG. 3 depicts an example embodiment of metadata created by the data exchange system in FIG. 1.

FIGS. 4A and 4B depict an example embodiment of a smart contract created by the data exchange system of FIG. 1.

FIG. 5A depicts an example embodiment of the functional interaction between the blockchain, the database, and the curation module in the data exchange system of FIG. 1.

FIG. 5B depicts an example embodiment of a blockchain ledger associated with the functional interaction in FIG. 5A.

FIG. 6A depicts an example embodiment of the functional interaction between the blockchain, the database, the modeling module, and the document analysis module in the data exchange system of FIG. 1.

FIG. 6B depicts an example embodiment of a blockchain ledger associated with the functional interaction in FIG. 6A.

DETAILED DESCRIPTION OF EMBODIMENTS

The following description of embodiments provides non-limiting representative examples to particularly describe features and teachings of different aspects of the invention. The embodiments described should be recognized as capable of implementation separately or in combination with other embodiments of the invention.

Figure 1:
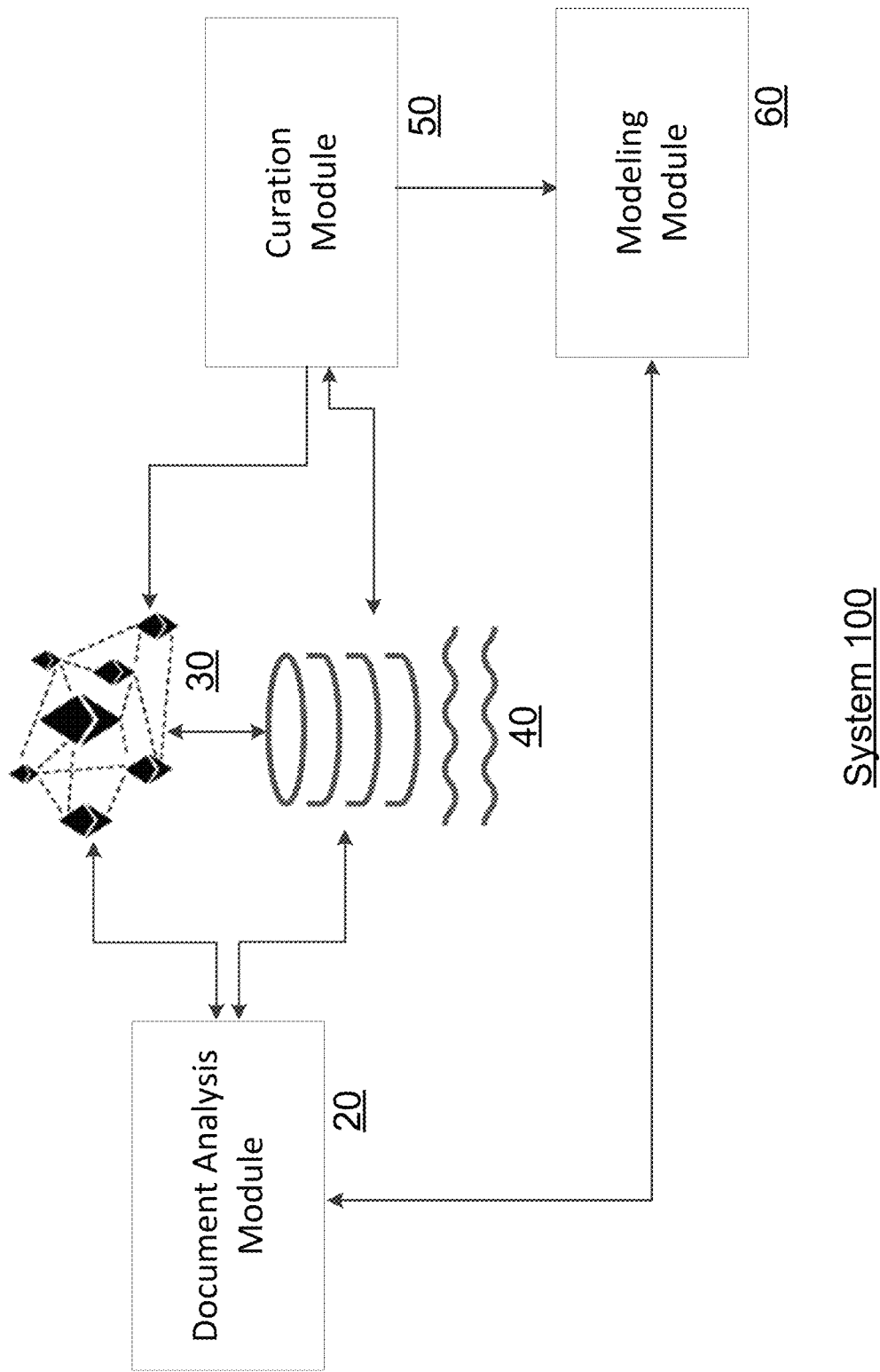
FIG. 1 depicts a functional diagram of a data exchange system according to an exemplary embodiment of the invention.

FIG. 1 depicts a functional diagram of a data exchange system according to an exemplary embodiment of the invention. According to an embodiment, a data exchange system 100 includes a document analysis module 20, a blockchain 30, a database 40, a curation module 50, and a modeling module 60.

According to an embodiment, each of the document analysis module 20, the blockchain 30, the curation module 50, and the modeling module 60 can be implemented with (i) servers and other computing devices in various configurations and (ii) dedicated software. For example, the document analysis module 20 can be comprised of servers and other computing devices that run software dedicated to the analysis of documents. The blockchain 30 can be comprised of servers and other computing devices that run software dedicated to implementing a distributed ledger system. The curation module 50 can be comprised of servers and other computing devices running software dedicated to the curation of documents and other data. The modeling module 60 can be comprised of servers and other computing device running software dedicated to retraining models.

Figure 2A:
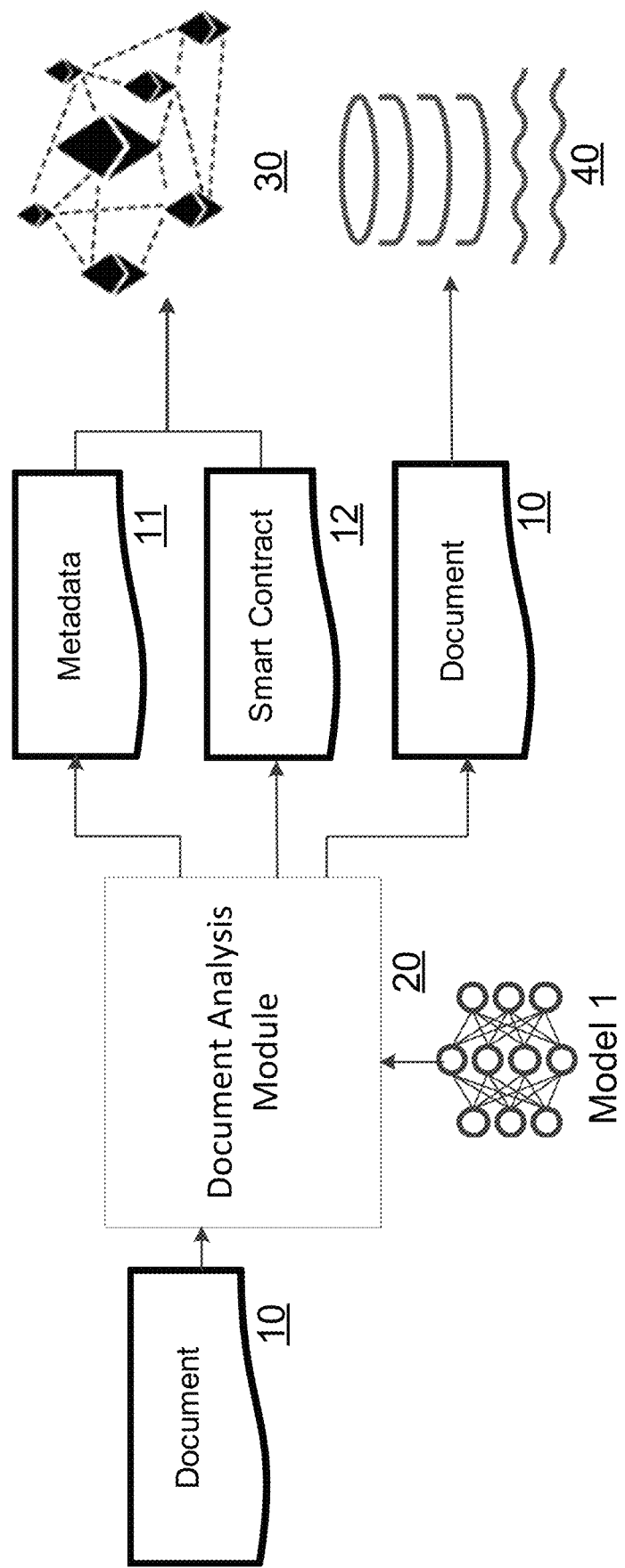
FIG. 2A depicts an example embodiment of the functional interaction between the document analysis module, the blockchain, and the database in the data exchange system of FIG. 1.

FIG. 2A depicts an example embodiment of the functional interaction between the document analysis module, the blockchain, and the database in the data exchange system of FIG. 1. As depicted in the figure, the document analysis module 20 implements a particular machine learning model, e.g., model 1. According to an embodiment, the machine learning model can be one of supervised learning, unsupervised learning, reinforcement learning, knowledge-based learning, natural-language-based learning (e.g., natural language generation, natural language processing), deep learning, etc. Further, the machine learning model can be utilized to extract attributes from a document 10 received at the document analysis module 20. For example, a solution for appraisal review may incorporate an automatic model to find specific kinds of information, such as "appraisal date" or "property address." The solution would allow reviewers to view the appraisal, review the found information, and correct it as necessary. According to an embodiment, the document 10 can include structured, semi-structured, and/or unstructured data. According to another embodiment, the document analysis module 20 can receive and analyze other data, such as images and speech.

The document 10 and corresponding extracted attributes can then be reviewed by a knowledge worker, thereby allowing the knowledge worker to review suggested information found in the document, investigate other possibilities, and correct any errors from the model. This suggested information can take the form of attributes, which are typically entities (such as addresses and proper names), or larger passages of text that can encompass audit evidence. The correction process results in new annotations of the document, as the user highlights (or annotates) the appropriate evidence rather than the error. Errors may include missing, wrong, or misleading information generated by the model 1. According to an embodiment, errors may indicate that there is something wrong with the machine learning model which can only be corrected through an update (e.g., re-training) of the machine learning model. They may also indicate an anomaly or a user-based error, hence the requirement for a curation step after analysis. After final review of approved facts by the knowledge worker, the document analysis module 20 can then generate metadata 11 and a corresponding smart contract 12 for the reviewed and annotated document 10.

According to an embodiment, the metadata 11 can include a variety of information about the reviewed document 10. For example, the metadata 11 can indicate (i) the ownership of the reviewed document 10, (ii) the location of the reviewed document 10, (iii) whether the reviewed document 10 needs to be retained or purged, and (iv) information about the particular keys required to access the reviewed document. The smart contract 12 can include computer protocols that execute when predefined conditions occur. For example, the smart contract 12 can execute specific protocols when the knowledge worker begins to curate a plurality of reviewed documents.

As depicted in FIG. 2A, the generated metadata 11 and smart contract 12 can be added to the blockchain 30. In particular, the metadata 11 and smart contract 12 can be stored in a block on the blockchain 30. FIG. 2B depicts an example of a distributed ledger in the blockchain of FIG. 2A. According to an embodiment, the distributed ledger in blockchain 30 is stored on a plurality of nodes 31, with each node being associated with a cryptographically-verified corresponding ledger 32. With the blockchain 30, the annotated and reviewed document 10's origin, chain of possession, and modifications can be tracked, traced, and presented chronologically in the cryptographically-verified ledger 32 to each participant of the blockchain 30. In particular, each "event" in the lifecycle of the reviewed document 10 may be considered a transaction, with the corresponding data being written on the chain as a new block. As such, the ledger 32 can provide an audit trail corresponding to all of the events in the lifecycle of the reviewed document 10, as well as who interacted with that event and when. According to an embodiment, each node may comprise one or more computer servers which provide processing capability and memory storage. Any changes made by any of the nodes 31 to a corresponding ledger 32 will be automatically reflected in every other ledger 32 in the blockchain 30. As such, with the distributed ledger in the blockchain 30, provenance may be provided with the dissemination of identical copies of the ledger 32, which has cryptographic proof of its validity, to each of the nodes.

Further, as also depicted in FIG. 2A, the document analysis module 20 can also provide the annotated and reviewed document 10 to the database 40. According to an embodiment, the database 40 can store a large amount of raw data in its native format. For example, the database 40 can be utilized to store documents 10 and other potential training data in their respective native formats. Further, the database 40 can also be utilized to store other types of data. According to another embodiment, the database 40 can correspond to other memory storage devices, e.g., a data warehouse.

Further, according to an embodiment, after the document analysis module 20 adds the reviewed document 10 to the database 40, it can also (i) adjust the location element in the metadata 11 to a particular location of the database 40 where the document is stored and (ii) adjust the smart contract 12 status to a curation mode, e.g., "SMP_CURATE," which will allow a knowledge worker, e.g., a subject matter professional ("SMP"), to later curate this particular document.

FIG. 2C depicts an example embodiment of a blockchain ledger associated with the functional interaction in FIG. 2A. According to an embodiment, the blockchain ledger 32 can include information about (i) the particular hash function value associated with the added metadata 11 and the smart contract 12 (e.g., "0x2do55e"), (ii) the name of the generated block associated with the added metadata 11 and the smart contract 12, (iii) the age of the particular transaction (e.g., "1 day"), (iv) where the blockchain 30 received the transaction request and/or document from (e.g., document analysis module 20), (v) the desired destination for the particular transaction and/or document (e.g., database 40), and (vi) the particular smart contract 13 function associated with the transaction (e.g., "Smart_Contract_12.add"). In the example depicted in FIG. 2C, the blockchain ledger 32 indicates that the document 10 was added to the database 40 from the document analysis module 20.

FIG. 3 depicts an example embodiment of metadata created by the document analysis module 20 of data exchange system in FIG. 1. As depicted in the figure, the metadata 11 can include a variety of information about a particular document 10, e.g., (i) the current name, (ii) the original name, (iii) provenance information, (iv) ownership information, (v) location information, (vi) whether the knowledge worker curator approved the document for use as training data, (vii) whether a data scientist curator approved the document for use as training data, (viii) whether the document is associated with a retention or purge policy, and (ix) the keys to access, open, and read the document, respectively. According to an embodiment, knowledge worker curators review the improvement data to determine whether the data provides a good example of the concept (for example, is "560 Lexington Avenue" a good example of the concept "Property Address" for an appraisal). The data science curator would instead be considering whether this same example is an appropriate example given the overall model itself (e.g., does this example demonstrate a possible flaw in the typology of the system, or demonstrate the need for a new modeling technique). The keys are used to provide permissions to users (both human and machine) to access the database 40. Once a user is allowed to have access, they can be given a key that is used in an access request to the database. The database only allows users with specific permissions (through those keys) to access the appropriate information.

FIG. 4A depicts an example embodiment of a smart contract created by the data exchange system of FIG. 1. FIG. 4B depicts a continuation of the smart contract in FIG. 4A. As depicted in FIGS. 4A and 4B, the smart contract 12 includes functions to allow humans and machines to access the document and modify the metadata that determines permissions, status, and management, e.g., (i) grant or deny permission to curate the document 10 to determine if it is appropriate for training data, (ii) request, get, and revoke access to the document 10, and (iii) add, purge, or retain the document 10 within the database.

FIG. 5A depicts an example embodiment of the functional interaction between the blockchain, the database, and the curation module in the data exchange system of FIG. 1. According to an embodiment, the curation module 50 can be utilized to curate a plurality of documents associated with a particular computer model such as a machine learning model. The curation can be performed by a user 51. The user 51 can be a data scientist or a knowledge worker, for example. During curation, the user 51 can review relevant documents to determine whether these documents are good training documents for the machine learning models or other models. According to an embodiment, in order to retrieve the relevant documents from the database 40, the curation module 50 sends a request to the blockchain 30 for every block including a smart contract 12 status set to the curation mode, e.g., "SMP_CURATE." In another embodiment, the curation module 50 can also send a request to the blockchain for every block including a smart contract status set to another curation mode, e.g., "DS_CURATE." According to an embodiment, the curation mode "SMP_CURATE" can be used by knowledge workers (e.g., subject matter professionals), while the curation mode "DS_CURATE" can be used by data scientists. After determining the blocks associated with either curation mode "SMP_CURATE" or "DS_CURATE," the curation module 50 may then determine the location of the documents in the database 40 by parsing the blocks' corresponding metadata 11. After the location of each of the documents in the database 40 is determined, the curation module 50 can then retrieve the relevant documents for curation. During the curation, the user 51 can select which of the retrieved documents are suitable to use as training data. The determination of suitability can be according to a variety of factors determined by the business, such as the type of model, the system that uses the models, the guidance of the system (due to regulatory, ethical, or marketing-based issues), etc. According to an embodiment, after the user 51 reviews a particular document, the curation module 50 can also adjust the metadata 11 associated with the particular document to indicate whether it was approved for use as training data. For example, the curation module 50 can adjust one of "smp_curator_approved" or "ds_curator_approved" if the particular document was approved for use as training data.

According to another embodiment, curation allows for human oversight to minimize bias in training data. Bias mitigation systems provide automatic checks for known types of bias in machine learning models (such as gender in HR systems), but can be difficult to tune for more domain-specific or pernicious types of bias (such as, for example, a zip code-based bias in credit risk models). According to an embodiment, a bias mitigation algorithm can be implemented on the curated training data before the training data is used to re-train the machine learning model. In this regard, the bias mitigation algorithm can be implemented by the curation module 50. However, in another embodiment, the bias mitigation algorithm can be implemented by the document analysis module 20 or the modeling module 60. According to an embodiment, the bias mitigation algorithm may result in training data with much less or no bias, thereby leading to a stronger machine learning model after retraining. Further, according to an embodiment, other algorithms can be implemented instead of or in addition to the bias mitigation algorithm. For example, at least one of a preservation and a retention script can be implemented. According to an embodiment, the preservation and retention scripts can determine which training data to keep and which to remove. As described above, the training data can be removed for a variety of reasons, e.g., the owner of the data decides to remove it, the current version of the data is no longer relevant or old, etc. Further, according to an embodiment, the preservation and retention scripts can be implemented once a day, one or more times a week, one or more times a month, one or more times a year, or other desired frequency. Further, similar to the bias mitigation algorithm, the preservation and retention scripts can be implemented in at least one of the curation module 50, the document analysis module 20, and the modeling module 60. Further, according to an embodiment, the smart contract 12 can determine if and when the bias mitigation algorithm and/or the preservation and retentions scripts are implemented for a particular document 10. Similarly, the metadata 11 and the ledger 32 can also include information indicating if either of the bias mitigation algorithm, preservation script, and/or the retention script was implemented for a particular document 10.

FIG. 5B depicts an example embodiment of a blockchain ledger associated with the functional interaction in FIG. 5A. As depicted in the figure, during curation, the blockchain ledger 32 indicates, via the smart contract 12 functions for curation by the knowledge worker (e.g., "Smart_Contract_12.smp_curate") and the data scientist (e.g., "Smart_Contract_12.smp_curate"), that the document 10 was requested for curation by the knowledge worker (e.g., "SMP_User") and the data scientist (e.g., "DS_User").

FIG. 6A depicts an example embodiment of the functional interaction between the blockchain, the database, the modeling module, and the document analysis module in the data exchange system of FIG. 1. According to an embodiment, the modeling module 60 can be utilized to retrain and update a machine learning model, e.g., model 1. In particular, the modeling module 60 retrains the machine learning model 1 using the previously-curated documents (e.g., documents 10) as training data. According to an embodiment, the modeling module 60 can first retrieve the machine learning model 1 from the document analysis module 20. The modeling module 60 can then request the relevant training documents from the blockchain 30 and the database 40. Specifically, the modeling module 60 sends a request to the blockchain 30 for every block including an indication that the corresponding document is approved for training. According to an embodiment, in response to the request from the modeling module 60, the blockchain 30 parses the metadata 11 of each of the blocks to determine if they include an indication that the corresponding documents are approved for training based on earlier curation. In particular, the blockchain 30 determines if either of conditions "smp_curator_approved" or "ds_curator_approved" are set to "true." According to an embodiment, after determining which of the documents are approved for training, the modeling module 60 can then retrieve those particular documents from the database 40. The modeling module 60 can then retrain the machine learning model 1 by adding the new documents to the training set. If the new documents result in an increase in accuracy, they may automatically be added to the training set, and a new model will be released, e.g., model 2. This new model 2 can then be incorporated into the document analysis module 20 at any time. Otherwise, data scientists can choose to conduct an error analysis to determine whether additional features or a new modeling method would be more appropriate. Either outcome may happen with the addition of any new training data, but the automatic methods to get to that outcome is facilitated by this process.

Given that the model improvement pipeline can run automatically once new data is available, thresholds can be set so that certain data known to be high quality, or where risk for error is low, can automatically bypass curation. For example, if the number of errors associated with a processed document 10 or set of documents is below a predefined error threshold, that document or documents can be stored directly in the database 40 and can be automatically treated as approved for use as training data, with or without corresponding metadata 11 and smart contract 12 being generated. This demonstrates a continuous improvement cycle for the data models, which, while difficult to enact for risk-averse organizations, may be appropriate as the models mature.

FIG. 6B depicts an example embodiment of a blockchain ledger associated with the functional interaction in FIG. 6A. As depicted in the figure, the blockchain ledger 32 indicates, via the smart contract 12 functions for accessing and requesting documents, that the modeling module 60 accessed and requested those documents approved for training from the database 40.

According to an embodiment, the document analysis module 20, the curation module 50, and the modeling module 60 can each be implemented in the same server or different servers.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The system described above can be implemented with servers and other computing devices in various configurations. The various servers and computing devices may use software to execute programs to execute the methods described above. Various embodiments of the invention also relate to the software or computer readable medium containing program instructions for executing the above described methods via the document analysis module 20, the blockchain 30, the database 40, the curation module 40, and the modeling module 60.

Although the foregoing examples show the various embodiments of the invention in one physical configuration; it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Communications networks connect the various computing devices described above and may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The communications networks that connect the various computing devices described above may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a GPS link, a cellular digital packet data (CDPD) link, a Research in Motion, Limited (RIM) duplex paging type device, a Bluetooth radio link, or an IEEE 802.11-based radio frequency link. Communications networks may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, the communication networks may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication networks may comprise a Personal Branch Exchange (PBX), which may further connect to the PSTN.

Although examples of servers and personal computing devices are described above, exemplary embodiments of the invention may utilize other types of communication devices whereby a user may interact with a network that transmits and delivers data and information used by the various systems and methods described herein. The personal computing devices may include desktop computers, laptop computers, tablet computers, smart phones, and other mobile computing devices, for example. The servers and personal computing devices may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The personal computing devices may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The personal computing devices may also include a network-enabled appliance or another TCP/IP client or other device. The personal computing devices may include various connections such as a cell phone connection, WiFi connection, Bluetooth connection, satellite network connection, and/or near field communication (NFC) connection, for example.

The servers and personal computing devices described above may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software. The modules described above may comprise software, firmware, hardware, or a combination of the foregoing.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers and personal computing devices described above may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, REXX, Visual Basic, and/or JavaScript and others. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

In the system and method of exemplary embodiments of the invention, a variety of "user interfaces" may be utilized to allow a user to interface with the personal computing devices. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A computer-implemented system for managing the curation of training data that is used to train a computer model, wherein the training data comprises a plurality of electronic documents, the system comprising:
   at least one computer processor, wherein the at least one computer processor is programmed with software to:
   extract one or more attributes from at least one electronic document;

receive an annotated version of the at least one electronic document reflecting one or more corrections to the extracted one or more attributes;

generate metadata for the annotated version of the at least one electronic document, comprising electronic document identification information, ownership information, provenance information, location information, and one or both of a curation status set by a knowledge worker curator and a curation status set by a data science curator;

generate a smart contract for the annotated version of the at least one electronic document that defines one or more condition-based execution protocols;

transmit the smart contract and the metadata to a blockchain for storage in a block on the blockchain, wherein the blockchain comprises a plurality of nodes operating on computer servers, wherein the nodes are connected via a network; and train the computer model using the at least one document as training data based on the smart contract and metadata in the blockchain.

2. The system according to claim 1, further comprising:
an electronic database, wherein the electronic database is configured to store the at least one electronic document.

3. The system according to claim 2, wherein the blockchain includes a ledger configured to maintain an audit trail of events associated with the at least one electronic document stored in the electronic database.

4. The system according to claim 2, wherein the at least one computer processor is further configured to store the at least one electronic document in the electronic database without generating a corresponding smart contract and metadata based on a determination that a number of errors associated with the at least one electronic document is less than a threshold number.

5. The system according to claim 1, wherein the at least one computer processor is further configured to apply the computer model onto the at least one electronic document and extract a plurality of attributes from the at least one electronic document.

6. The system according to claim 5, wherein the at least one computer processor is further configured to generate a second computer model based on the training data.

7. The system according to claim 1, wherein the smart contract controls document access to the at least one electronic document.

8. The system according to claim 1, wherein the metadata further specifies: (i) whether the at least one electronic document is associated with one of a retention policy or purge policy and (ii) keys to at least one of: access, open, and read the at least one electronic document.

9. The system according to claim 1, wherein the at least one computer processor is further configured to apply at least one of a bias mitigation algorithm, a preservation script, and a retention script on the training data.

10. A computer-implemented method for managing the curation of training data that is used to train a computer model, wherein the training data comprises a plurality of electronic documents, the method comprising:

extracting, with at least one computer processor, one or more attributes from at least one electronic document;

receiving, with the at least one computer processor, an annotated version of the at least one electronic document reflecting one or more corrections to the extracted one or more attributes;

generating, with the at least one computer processor, metadata for the annotated version of the at least one electronic document comprising electronic document identification information, ownership information, provenance information, location information, and one or both of a curation status set by a knowledge worker curator and a curation status set by a data science curator;

generating, with the at least one computer processor, a smart contract for the annotated version of the at least one electronic document that defines one or more condition-based execution protocols;

transmitting, with the at least one computer processor, the smart contract and the metadata to a blockchain for storage in a block on the blockchain, wherein the blockchain comprises a plurality of nodes operating on computer servers, wherein the nodes are connected via a network; and training, with the at least one computer processor, the computer model using the at least one document as training data based on the smart contract and metadata in the blockchain.

11. The method according to claim 10, further comprising:
storing, with the at least one computer processor, the at least one electronic document in an electronic database.

12. The method according to claim 11, wherein the blockchain includes a ledger configured to maintain an audit trail of events associated with the at least one electronic document stored in the electronic database.

13. The method according to claim 11, further comprising:
upon determining, with the at least one computer processor, that a number of errors associated with the at least one electronic document is less than a threshold number, storing the at least one electronic document in the database without generating a corresponding smart contract and metadata.

14. The method according to claim 10, further comprising:
applying, with the at least one computer processor, the computer model onto the at least one electronic document; and
extracting, with the at least one computer processor, a plurality of attributes from the at least one electronic document.

15. The method according to claim 14, further comprising:
generating, with the at least one computer processor, a second computer model based on the training data.

16. The method according to claim 10, wherein the smart contract controls document access to the at least one electronic document.

17. The method according to claim 10, wherein the metadata further specifies: (i) whether the at least one electronic document is associated with one of a retention policy or purge policy and (ii) keys to at least one of: access, open, and read the at least one electronic document.

18. The method according to claim 10, further comprising:
applying, with the at least one computer processor, at least one of a bias mitigation algorithm, a preservation script, and a retention script on the training data.

* * * * *